United States Patent [19]

Potier

[11] Patent Number: 4,753,459
[45] Date of Patent: Jun. 28, 1988

[54] JOINT FOR CONNECTING AN ELASTICALLY-DEFORMABLE HOSE TO A RIGID TUBE

[75] Inventor: Michel Potier, Rambouillet, France

[73] Assignee: VALEO, Societe Anonyme Francaise, Paris, France

[21] Appl. No.: 916,553

[22] Filed: Oct. 8, 1986

[30] Foreign Application Priority Data

Oct. 8, 1985 [FR] France .................. 85 14887

[51] Int. Cl.⁴ ............................ F16L 33/02
[52] U.S. Cl. .................... 285/174; 285/23; 285/238; 285/253; 285/260; 285/305; 285/331
[58] Field of Search ............. 285/921, 253, 260, 174, 285/233, 364, 331, 349, 320, 321, 305, 406, 238–242, 23

[56] References Cited

U.S. PATENT DOCUMENTS

| | | | |
|---|---|---|---|
| 1,047,962 | 12/1912 | Marion | 285/242 |
| 2,226,039 | 12/1940 | Wiltse | 285/253 |
| 2,281,633 | 5/1942 | Stitzer | 285/233 |
| 2,283,975 | 5/1942 | Dillon | 285/253 |
| 2,349,538 | 5/1944 | Craig | 285/242 |
| 2,455,760 | 12/1948 | Gustafson | 285/242 |
| 3,964,772 | 6/1976 | Cox, Jr. | 285/174 |
| 4,093,280 | 6/1978 | Yoshizawa et al. | 285/174 |
| 4,214,586 | 7/1980 | Mericle | 285/921 |
| 4,451,070 | 5/1984 | Sauer | 285/242 |
| 4,600,222 | 7/1986 | Appling | 285/921 |
| 4,632,435 | 12/1986 | Polyak | 285/921 |
| 4,635,973 | 1/1987 | Sauer | 285/242 |

FOREIGN PATENT DOCUMENTS

| | | | |
|---|---|---|---|
| 532021 | 10/1956 | Canada | 285/242 |
| 68987 | 11/1951 | Netherlands | 285/242 |

Primary Examiner—Randolph A. Reese
Assistant Examiner—Anthony Knight
Attorney, Agent, or Firm—Dennison, Meserole, Pollack & Scheiner

[57] ABSTRACT

The invention relates to a joint for connecting an elastically-deformable hose (14) and a rigid tube (22) having a smooth cylindrical outside surface. The tube (22) has a radial projection (26) on its outside surface which constitutes an abutment for the end of the hose (14) and also an anchor point for a clamping ring (28). The invention is applicable to mounting rubber hoses to rigid water inlet and outlet fittings on heat exchangers in motor vehicles, in particular.

3 Claims, 2 Drawing Sheets

JOINT FOR CONNECTING AN ELASTICALLY-DEFORMABLE HOSE TO A RIGID TUBE

The invention relates to a joint for connecting an elastically-deformable hose to a rigid tube, such as a liquid inlet or outlet fitting to a water box of a heat exchanger, for example, and in particular a radiator forming a part of a cooling circuit for an internal combustion engine of a motor vehicle or forming part of an installation for heating or air conditioning the cabin of a motor vehicle.

BACKGROUND OF THE INVENTION

The water box of such a heat exchanger is generally molded as a single piece of plastic having at least one liquid inlet or outlet fitting. The free end of this fitting generally includes a rim projecting outwardly from its outside surface. The end of an elastically-deformable hose, e.g. made of rubber or analogous material, is thrust over the end fitting and its rim, and then serves to connect the end fitting to a liquid circuit. The end of the hose is clamped around the end of the inlet or outlet fitting by means of a conventional clamping collar which is disposed beyond the rim and around the end of the hose and the end fitting which it encloses so as to prevent the hose from being pulled off the fitting, for example by direct traction on the hose or by a sudden change in the pressure of the liquid flowing along the hose.

However, awkward problems are associated with molding such a rim on the outside surface of the free end of the inlet or outlet fitting. The mold which determines the outside shape of the end fitting and its rim is in two parts which meet along a join plane that passes through the axis of the fitting. As a result, on unmolding there is a risk of flash or at least a mold line running along the outside surface of the fitting in the join plane, and even quite a small mold line can give rise to leakage of liquid when the hose is mounted on the fitting and held in place by a clamping collar. It is therefore often necessary to remove the mold line after the water box and its inlet or outlet fitting have been unmolded, thereby increasing production costs. Further, the rim on the outside surface around the end of the inlet/outlet fitting requires the end of the hose to be put into place during assembly by force.

Preferred embodiments of the present invention avoid the above drawbacks.

SUMMARY OF THE INVENTION

In general terms, the invention provides a joint for connecting an elastically-deformable hose to a rigid tube or inlet/outlet fitting which does not include an outwardly-projecting rim at its end, while nevertheless enabling the end of the hose to be positively connected to the tube or inlet/outlet fitting in sealed manner.

More particularly, the present invention provides a joint for connecting an elastically-deformable hose to a rigid tube, such as a liquid inlet or outlet fitting on a water box of a heat exchanger, the end of the tube over which the end of the hose is to be fitted having an outside surface which is smooth and cylindrical, the joint including the improvement whereby the rigid tube includes at least one radial projection from its outside surface in the vicinity of its end, said projection having a front face which constitutes an abutment for the end face of the hose fitted over the tube, the joint further including a clamping ring which surrounds the end of the hose where it is fitted over the tube and which includes at least one tooth projecting radially inwardly from its inside surface and engaging a rear face of said radial projection on the tube.

When applied to the water box of a heat exchanger, a joint in accordance with the invention enables the inlet or outlet fitting of the water box to be formed without a rim at its end, thereby making it easier to assemble the hose on the fitting, and also avoiding the risks of a leak-inducing mold line as observed in the prior art, since the fitting may be made in a one-piece mold which does not include a join plane as described above. Further, the clamping ring latching onto the radial projection from the tube ensures that the hose is positively held on the tube.

In a first embodiment of the invention, the clamping ring is split parallel to its axis and is associated with clamping means for drawing its end portions towards each other in order to clamp the end of the hose onto the end of the tube.

These clamping means may be constituted by a screw and nut assembly, with the screw being received in a recess in one end of the ring while the nut is received in a recess in the other end of the ring.

The clamping means may alternatively be constituted by a clamping collar of conventional type which completely surrounds said ring.

In order to ensure sealing, it is advantageous for the inside surface of the ring to include at least one inwardly projecting annular rib for radially compressing the end of the hose fitted over the end of the tube.

In another embodiment of the invention, the inside surface of the ring includes corrugations whose ridges and furrows lie parallel to the axis of the tube, said ring surrounding an intermediate sleeve which is split longitudinally and whose inside cylindrical surface presses against the outside surface of the hose fitted to the tube and whose outside surface has corrugations corresponding to those on the inside surface of the ring, whereby said sleeve is unclamped when the ridges of the ring corrugations are received in the furrows of the sleeve corrugations, and is clamped when the ridges of the ring corrugations are caused to bear against the ridges of the sleeve corrugations by rotation through a fraction of a turn.

In order to facilitate clamping, the sleeve is prevented from rotating on the end of the tube, at least in one direction of ring rotation, for example by means of a finger which is formed on the end of the sleeve adjacent to the radial projection on the tube and which is brought by rotation into abutment against a radial face of said projection.

In yet another embodiment of the invention, the end of the hose for fitting over the end of the tube is in the form of a rigid tubular end fitting fixed to the hose and having at least one internal annular groove in which an O-ring is received for surrounding the end of the tube in sealed manner.

In this embodiment, the above-specified ring is split parallel to its axis and its end which co-operates with the radial projection from the tube includes an inwardly projecting annular rim for snap-fitting over said radial projection, the snap-fitting effect being obtained by axial translation of the ring along the tube.

The above-described end fitting provided at the end of the hose terminates with an outwardly-directed flange which comes into abutment against the radial projection from the tube and against which a second annular rim projecting inwardly from the ring also comes into abutment when the ring is snap-fitted to the annular projection from the tube.

This embodiment of a joint in accordance with the invention simplifies automating assembling and fixing the end of the hose on the tube.

BRIEF DESCRIPTION OF THE DRAWINGS

Embodiments of the invention are described by way of example with reference to accompanying drawings in which.

DETAILED DESCRIPTION

Figure 1:
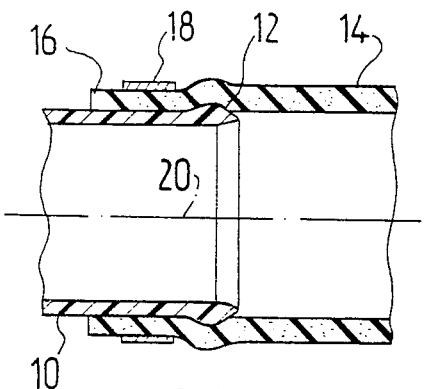
FIG. 1 is a diagrammatic axial section through a prior art joint.

Reference is made initially to FIG. 1 which is a diagram showing a conventional joint between the ends of an elastically-deformable hose, for example a rubber hose, and the end of a rigid tube, and in particular the liquid inlet or outlet end fitting for a water box of a heat exchanger.

As can be seen in FIG. 1, the liquid inlet or outlet end fitting 10 which is integrally molded with the water box (not shown) is generally in the shape of a right cylinder and its free end has an outwardly-projecting rim 12 on its outside surface. The end portion 16 of a hose 14 made of rubber or analogous material is force-fitted over the end of the tube 10. The presence of the rim 12 makes it necessary to exert a degree of force sufficient for radially expanding the hose 14 as it passes over the rim 12. The end portion 16 of the hose 14 is held in place on the end of the tube 10 by a clamping collar 18 of conventional type, which generally comprises a metal strip which surrounds the end portion 16 of the hose 14 together with means for clamping or radially contracting said strip, so as to radially compress the end portion 16 of the hose on the end of the tube 10. Since the clamping collar 18 is situated beyond the rim 12, it can readily be understood that a clamped collar prevents the end portion 16 of the hose 14 from sliding over the end of the tube 10 and coming away therefrom.

However, as mentioned above, forming a rim 12 on the outside surface of the end of the tube 10 requires the tube to be made in a two-part mold in which the parts meet each other along a diametrical join plane passing through the axis 20 of the tube 10. The flash or mold line which may form on the outside surface of the tube 10 at said join plane can prevent the end of the hose 14 being mounted thereon in a properly sealed manner, and it must therefore be removed.

A joint in accordance with the invention avoids these drawbacks, and various embodiments thereof are described with reference to FIG. 2 upwards.

Figure 2:
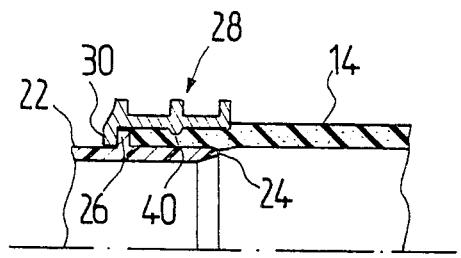
FIG. 2 is a half axial section through a joint in accordance with the invention.
Figure 3:
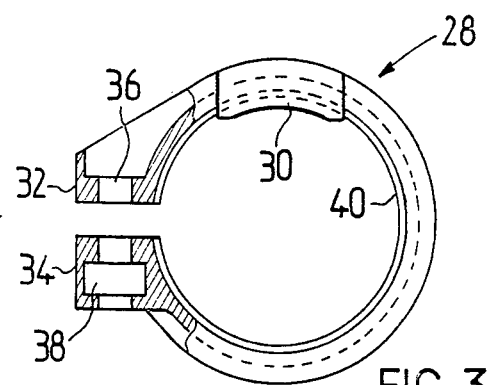
FIG. 3 is a partially cutaway end view of the clamping ring used in the FIG. 2 joint.

Reference is now made to FIGS. 2 and 3 which show a first embodiment of a joint in accordance with the present invention.

The end of the hose 14 made of rubber or analogous material is fitted over the end of a rigid tube 22, and the outside surface of the end of the tube does not have a rim so it can be cylindrical and substantially smooth.

Close to the free end 24 of the tube 22 there is at least one radial projection 26 from the outside surface of the tube. The radial projection may be continuous in the form of an annular rib, or it may be discontinuous, or it may be constituted by a single tooth projecting radially from the outside surface of the tube 22. The free end of the hose 14 is fitted over the cylindrical end of the tube 22 until it comes into abutment with the front face of the radial projection 26. No particular force is required to put the hose in place. A clamping ring 28 surrounds the end of the hose 14 where it is fitted over the end of the tube 22, and the leading edge of the clamping ring 28 has at least one inwardly-directed radially projecting tooth 30 which engages the rear face of the radial projection 26 on the tube.

As can be seen in FIG. 3, ring 28 is split parallel to its axis and thus has two ends 32 and 34 which are close to each other. In order to clamp the ring, the end 32 includes a hole 36 for receiving a screw while the end 34 includes a hole 38 for receiving a nut. The ends 32 and 34 of the ring are drawn together by screwing the screw into the nut, thereby radially contracting the ring. The radial contraction of the ring radially compresses the end of the hose against the tube 22.

In order to improve sealing, an inwardly-projecting radial rib 40 may be formed on the inside cylindrical surface of the ring 28.

The split shape of the ring 28 makes it easy to assemble, while unclamped, over the end of the tube 22. As can be seen in FIG. 2, the inside diameter of the ring 28 when in the clamped state is substantially equal to the outside diameter of the radial projection 26 (which is in the form of an annular rib) on the tube 22.

The outside surface of the ring 28 may include a plurality of outwardly-projecting reinforcing ribs.

Figure 4:
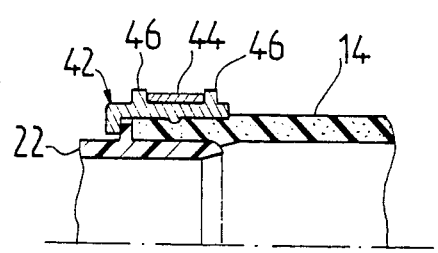
FIG. 4 is a half axial section through another embodiment of a joint in accordance with the invention.

The embodiment shown in FIG. 4 differs from the embodiment shown in FIGS. 2 and 3 in that the clamping ring 42 for holding the end of the hose 14 on the end of the tube 22 is a simple split ring whose facing ends do not include recesses 36 and 38 for receiving a screw and a nut respectively. In this case, the ring is clamped on the end of the hose 14 by means of a conventional clamping collar 44, for example a collar of the type shown in FIG. 1 which surrounds the outside of the ring 42.

As can be seen in FIG. 4, the outside surface of the ring may include a pair of annular ribs 46, with the strip of the clamping collar 44 being received therebetween.

Otherwise, the ring 42 has the same characteristics as the ring 28 shown in FIGS. 2 and 3.

Figure 5:
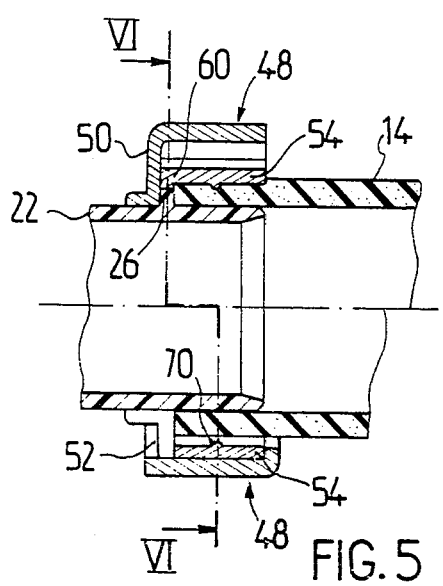
FIG. 5 is an axial section through another embodiment of a joint in accordance with the invention, with the top half of the figure showing the joint in the clamped state and the bottom half of the figure showing the joint in the unclamped state.
Figure 6:
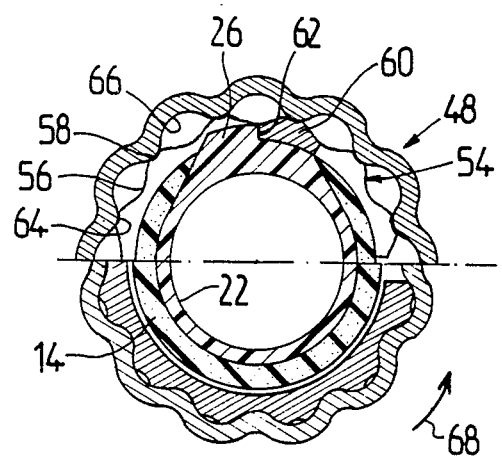
FIG. 6 is a cross-section on line VI—VI of FIG. 5.

Reference is now made to FIGS. 5 and 6 which show another embodiment of a joint in accordance with the invention.

In this embodiment, the clamping ring 48 is a continuous, non-split ring whose inside diameter is greater than the outside diameter of the hose 14 whose end is fitted over the end of the tube 22. The leading end of the ring 48 has an inwardly-projecting annular rim 50 for engaging the rear face of the radial projection 26 on the tube 22. This radial projection is not formed as a continuous annular rib, but as one or more radially-projecting teeth which are angularly spaced from one another. In order to enable the ring 48 to be assembled on the end of the tube, the annular rim 50 on the ring may include local gaps, such as the gap referenced 52.

The ring 48 surrounds an intermediate sleeve 54 which is split parallel to its axis and whose inside cylindrical surface surrounds the end of the hose 14, while its outside surface is corrugated with ridges 58 and furrows 56 which lie parallel to the axis of the sleeve. The leading end of the sleeve 54 includes a finger 60 extending parallel to the axis of the sleeve and suitable for engaging a radial face 62 on the projection 26 from the tube 22, thereby preventing the sleeve 54 from rotating relative to the tube 22 in a counter-clockwise direction as shown in FIG. 6.

The inside surface of the ring 48 also has corrugations and these correspond to the corrugations on the outside surface of the sleeve 54 so that the ridges 64 and the furrows 66 in the corrugations on the ring 48 can be received respectively in the furrows 56 and the ridges 58 of the corrugations on the sleeve 54, when the joint is in the unclamped condition, as shown in the bottom halves of FIGS. 5 and 6.

By rotating the ring 48 through a fraction of a turn in the direction of arrow 68, the ridges 64 of the corrugations on the ring 48 can be brought to bear against the ridges 58 of the corrugations on the sleeve 54, as shown in the top halves of FIGS. 5 and 6. As a result, the sleeve 54 is radially compressed, thereby radially compressing the end of the hose 14 where it is fitted over the tube 22.

In order to improve sealing, the inside cylindrical surface of the intermediate sleeve 54 may include an annular rib 70 for increasing the radial compression applied to the end of the hose 14 on the tube 22.

In order to facilitate clamping this joint, the ridges 58 of the corrugations on the intermediate sleeve 54 may be truncated or slightly indented, as shown in FIG. 6, thereby facilitating correct location of the ring 48 in the clamping position and preventing accidental unclamping.

Figure 7:
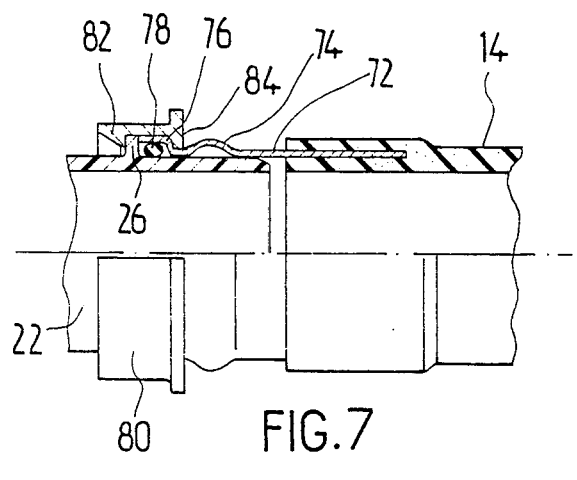
FIG. 7 is a half axial section through another embodiment of a joint in accordance with the invention.
Figure 8:
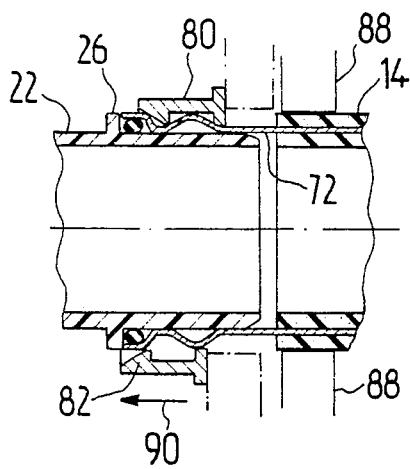
FIG. 8 is a diagram showing how the FIG. 7 embodiment can be assembled automatically.

Reference is now made to FIGS. 7 and 8 which show another embodiment of a joint in accordance with the invention.

In these figures the end of the elastically-deformable hose 14 is fixed, for example by a molding operation, to a rigid tubular end fitting 72 made of metal. The end fitting could also be made of plastic and it could be fixed to the end of the hose 14 in various ways other than molding, as shown.

The inside diameter of the rigid end fitting 72 is substantially equal to the outside diameter of the tube 22 and it includes two annular corrugations 74 and 76 which define two annular grooves in the inside surface of the end fitting, with the inner corrugation 74 being formed in an intermediate portion of the end fitting and the corrugation 76 being formed at its free end. The outside diameter of the end corrugation 76 is substantially equal to the outside diameter of the radial projection 26 on the tube 22 such that the free end of the end fitting 72 may be applied against the front face of said radial projection when the end fitting 72 is fitted over the end of the tube 22. An O-ring 78 is closely fitted around the end of the tube 22 and is located immediately in front of the radial projection 26 while being compressed inside the end corrugation 76 of the end fitting 72. A clamping ring 80 which is split parallel to its axis surrounds the corrugated end of the end fitting 72 where fitted over the tube 22 and includes, at its leading end, an annular snap-fitting rim 82 which projects inwardly from its inside face and which is intended to latch against the rear face of the radial projection 26 from the tube 22. The trailing end of the ring 80 has a second inwardly-projecting annular rim 84 on its inside face, and the second rim is intended to engage the trailing edge of the end corrugation 76 on the end fitting 72.

This joint may be assembled automatically, as shown diagrammatically in FIG. 8.

Assembly takes place as follows:

Initially, the annular ring 80 is located around the middle portion of the rigid end fitting 72 and covers, for example, its inner corrugation 74. In this position, the leading, snap-fastening rim 82 of the ring lies between the end corrugation 76 and the inner corrugation 74. The end of the hose 14 which is molded onto the end of the end fitting 72 is grasped by means of a gripper 88, or the like of which only a portion is shown in FIG. 8. The gripper is moved in axial translation towards the end of the tube 22 to engage the end fitting 72 on the end of the tube, as shown in the top half of FIG. 8. Thereafter, the gripper 88 is slightly opened and continues to be moved towards the ring 80 in order to thrust it axially in the direction indicated by arrow 90 (as shown in dot-dashed lines) until the annular snap-fastening rim 82 of the ring has passed over the radial projection 26 on the tube 22. The ring 80 is then in the position shown in FIG. 7, in which the end of the end fitting 72 is clamped in sealed manner onto the end of the tube 22.

Figure 9:
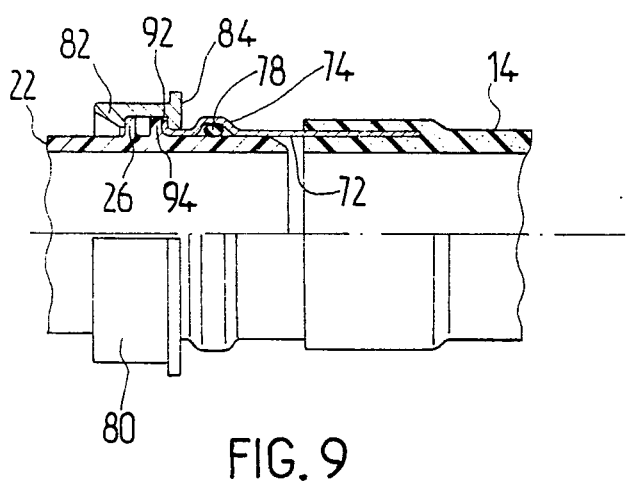
FIG. 9 is a half axial section through a variant of the embodiment shown in FIG. 7.

The embodiment shown in FIG. 9 differs from the FIG. 7 embodiment in that the O-ring 78 is received in the inner corrugation 74 of the end fitting 22. In this case, the end corrugation 76 of the end fitting 72 may be replaced by an outwardly-directed annular flange 92. The flange comes into abutment against the radial projection 26 on the tube 22, supposing said radial projection extends a certain distance axially, or else against another radial projection 94 on the tube 22 disposed ahead of the radial projection 26, as shown in FIG. 9. The end flange 92 on the end fitting 72 is thus held between the radial projection 94 and the second annular rim 84 on the split ring 80.

Naturally, the invention is not applicable solely to fitting hoses to end fittings on water boxes in heat exchangers for motor vehicles, but to any joint between a rigid tube or duct and a hose which is flexible or elastically deformable.

I claim:

1. A joint for connecting an elastically-deformable hose to a rigid tube, such as a liquid inlet or outlet fitting on a water box of a heat exchanger, the joint comprising a rigid tube connecting portion having a smooth cylindrical outside surface terminating in a tube end, said tube connecting portion including at least one radial projection from its outside surface inward of its end, said joint further comprising a hose connecting portion received over the tube connecting portion and terminating in a free end, said projection having a front face directed toward said tube end and a rear face directed away from said tube end, said front face comprising an abutment against which the free end of the hose connecting portion engages and is retained, the joint further including an annular clamping ring surrounding the free end of the hose connecting portion and a section of the hose connecting portion immediately adjacent thereto, said clamping ring radially inwardly biasing said hose connecting portion circumferentially thereabout, said clamping ring projecting beyond said free end and including at least one member projecting radially inwardly from its inside surface and engaging the rear face of said radial projection on the tube, said hose connecting portion being a rigid tubular end fitting fixed to the hose and including at least one internal annular groove receiving an O-ring for fitting closely around the connecting portion of the tube.

2. A joint according to claim 1, wherein said end fitting is terminated by a radial extension which defines the free end of the hose connecting portion which engages against the radial projection on the tube, and an inwardly directed annular rim on said clamping ring in abutment with said radial extension when said clamping ring is in its clamping position with the radial extension retained against said radial projection by said annular rim.

3. A joint for connecting an elastically-deformable hose to a rigid tube, such as a liquid inlet or outlet fitting on a water box of a heat exchanger, the joint comprising a rigid tube connecting portion having a smooth cylindrical outside surface terminating in a tube end, said tube connecting portion including at least one radial projection from its outside surface inward of its end, said joint further comprising a hose connecting portion received over the tube connecting portion and terminating in a free end, said projection having a front face directed toward said tube end and a rear face directed away from said tube end, said front face comprising an abutment against which the free end of the hose connecting portion engages, the joint further including an annular clamping ring surrounding the free end of the hose connecting portion and a section of the hose connecting portion immediately adjacent thereto, said clamping ring projecting beyond said free end and including at least one member projecting radially inwardly from its inside surface and engaging the rear face of said radial projection on the tube, said hose connecting portion comprising a rigid tubular end fitting fixed to the hose and including at least one internal annular groove receiving an O-ring for fitting closely around the connecting portion of the tube, said end fitting terminating in a radial extension which defines the free end of the hose connecting portion which engages against the radial projection on the tube, and an inwardly directed annular rim on said clamping ring in abutment with said radial extension when said clamping ring is in its clamping position with the radial extension retained against said radial projection by said annular rim, the clamping ring being split parallel to its axis, and said member projecting radially inward and engaging the rear face of the radial projection from the tube comprising an inwardly-directed annular snap-fastening rim engaging the rear face of said radial projection when said clamping ring is moved in axial translation relative to the tube, the first-mentioned annular rim on said clamping ring engaging the radial extension on the end fitting of the hose against the front face of the projection on the tube as the snap-fastening rim engages the rear face of the radial projection.

* * * * *